July 6, 1926.
M. Q. CORBETT
1,591,610
BALLONET INDICATOR FOR AIRSHIPS
Filed April 18, 1922
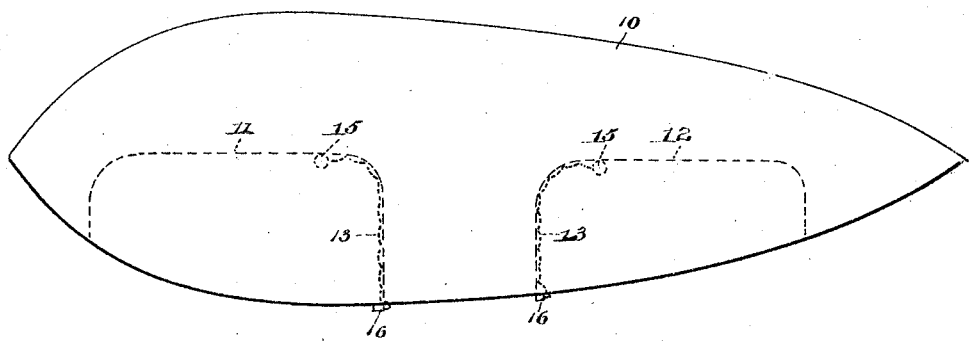
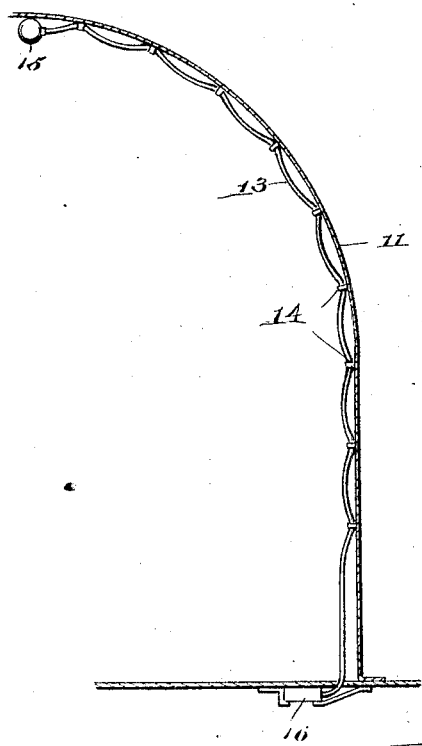
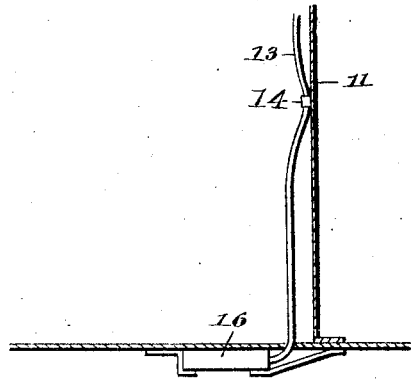
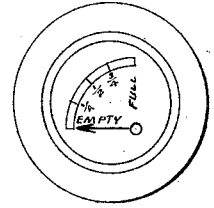
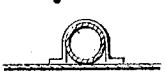
Inventor
Mott Q Corbett
By Robert N Young Atty.

Patented July 6, 1926.

1,591,610

UNITED STATES PATENT OFFICE.

MATT Q. CORBETT, OF CARNEGIE, PENNSYLVANIA.

BALLONET INDICATOR FOR AIRSHIPS.

Application filed April 13, 1922. Serial No. 554,424.

My invention relates to means for indicating the degree of inflation of the ballonets of a dirigible airship.

The amount of air in the fore and aft ballonets of a non-rigid airship is a variable quantity during flight. Airship pilots for a long time have felt the necessity for a suitable instrumentality for measuring the amount of air in and fullness of the ballonets, for although a rough mental estimate is made from time to time during flight as to the amount of air in the ballonets, there has been no means for checking such estimate. Conditions often arise, particularly at the end of a long flight, or at sundown which make it important to know just how full the individual ballonets are.

The object of my invention is to provide means for indicating with accuracy to the pilot the amount of air in or degree of inflation of each ballonet. As the amount of air in a ballonet decreases the indicating means of this invention shows the pilot the condition as regards inflation of each ballonet.

The invention consists in the novel arrangement and means herein fully described, illustrated and claimed.

In the accompanying drawings:

Fig. 1 is a diagrammatic side view of a balloon, showing the invention;

Fig. 2 is a transverse fragmentary vertical section through a ballonet;

Fig. 3 is an enlarged fragmentary vertical transverse section showing the location and mounting of the indicator;

Fig. 4 is a detail section showing a means of fastening the liquid container to a ballonet; and Fig. 5 is a face view of the indicator.

The balloon or gas bag 10 of a non-rigid airship contains and encloses fore and aft ballonets 11 and 12 which are filled with air. The amount and condition of air in said ballonets is variable and it becomes important, under varying atmospheric conditions, for the pilot to know the degree of fullness of the ballonets. In order to accomplish this in a reliable way without any work or attention on the part of the pilot and with the smallest number of working parts, I use in connection with each ballonet, a liquid containing means such as a flexible pipe or tube 13, filled with any suitable liquid, as water, for example.

The tube 13 is extended along a vertical wall of the ballonet, as shown, and may be attached thereto by any suitable means such as straps 14 (see Fig. 4). The tube may be extended along a portion of the top wall of the ballonet, as shown in Figs. 1 and 2 and may have attached to its upper end a bulb or enlarged chamber 15. Tube 13 may obviously be placed either inside or outside of the ballonet, but is preferably placed inside as shown in the drawing.

The lower end of the tube 13 communicates with an indicator 16 of the pressure gage type, such as a Bourdon tube pressure gage, the latter being located outside of the ballonet as shown in Fig. 3, facing downwardly so that it may be seen by the pilot in the car beneath. As shown in Fig. 3, the indicator is supported in a pocket on the bottom of the bag or balloon 10. Any suitable means may be used to refill the liquid container.

The face of the indicator is calibrated to show the degree of fullness of the respective ballonet, preferably as shown in Fig. 5, the graduations indicating "full", "empty", "one quarter", "one half" and "three quarters", these being considered sufficient to give a fairly accurate gage as to the condition of the ballonet.

The apparatus is light in weight and involves no mechanical working parts outside of the indicator itself. As the amount of air varies in the ballonet the wall thereof to which the bulb 15 is attached will move relatively to the indicator 16 hence the movement of the bulb 15 to and away from the indicator 16. The indicator is operated and controlled by the height of the column of liquid, such height varying in accordance with the fullness of the ballonet.

I claim:

1. The combination with a balloon having a ballonet therein, an indictor for indicating the degree of inflation of the ballonet, and liquid containing means movable with a wall of the ballonet for operating said indicator in accordance with the movement of the ballonet wall and means for attaching said liquid containing means on said ballonet.

2. The combination with a balloon having a ballonet therein, a liquid-containing means movable with a wall of the ballonet means for attaching said liquid containing means on said ballonet, and an indicator in communication with said liquid-containing means to indicate the degree of inflation of the ballonet, the indicator being controlled by the head of liquid in said liquid containing means.

3. The combination with a balloon having a ballonet therein, an indicator for indicating the degree of inflation of the ballonet, and liquid containing means movable with a wall of the ballonet for operating said indicator in accordance with the movement of the ballonet wall, means for attaching said liquid containing means to an upper wall of said ballonet, and means for attaching said indicator to said balloon.

4. The combination with a balloon having a ballonet therein, an indicator for indicating the degree of inflation of the ballonet, and flexible liquid containing means movable with a wall of the ballonet for operating said indicator in accordance with the movement of the ballonet wall, and means for attaching said liquid containing means to a wall of the ballonet.

5. The combination with a balloon having a ballonet therein, a flexible liquid containing means movable with a wall of the ballonet, and an indicator in communication with said liquid-containing means to indicate the degree of inflation of the ballonet, the indicator being controlled by the head of liquid in said liquid containing means.

In testimony whereof I affix my signature.

MATT Q. CORBETT.